United States Patent Office 2,794,799
Patented June 4, 1957

2,794,799

PROCESS OF PREPARING MIXED ESTERS OF CELLULOSE CONTAINING DICARBOXYLIC ACID GROUPS

Gordon D. Hiatt and John Emerson, Rochester, N. Y., assignors to Eastman Kodak Company, Rochester, N. Y., a corporation of New Jersey No Drawing. Application January 28, 1954,
Serial No. 406,890

10 Claims. (Cl. 260—225)

This invention relates to the preparation of cellulose mixed esters or ether-esters containing fatty acid or alkyl and dicarboxylic acid groups by reacting upon a hydrolyzed fatty acid ester of cellulose or a cellulose ether having free hydroxyl with an esterification bath comprising phthalic acid, a lower fatty acid anhydride, and a catalyst which exhibits basic properties in non-aqueous aliphatic acid solution.

Various methods have been suggested for the preparation of dicarboxylic acid esters of cellulose. For instance, in the manufacture of cellulose acetate phthalate or cellulose ether phthalate the method commonly employed at the present time consists in treating a hydrolyzed cellulose acetate or a cellulose ether with phthalic anhydride in the presence of pyridine as described and claimed in Malm and Waring Patent No. 2,093,462 dated September 21, 1937. In this process the large amount of pyridine which is employed acts both as a solvent and as the catalyst in the esterification bath. Because of the large quantity of pyridine employed the process involves economic considerations and in addition the large quantities of that material used may become objectionable. In the case of the preparation of the maleic acid esters of cellulose, the pyridine and maleic anhydride used will also react with each other; hence in the preparation of those esters various difficulties arise.

Other methods of preparing dicarboxylic acid esters of cellulose have been suggested in which part of the pyridine has been replaced by volatile organic solvent. The use of acetic acid in those procedures has been avoided because it was erroneously thought that acetyl from the acetic acid would be added to the cellulose. The use of acetic anhydride (or other lower fatty acid anhydrides) has been heretofore avoided in such processes to minimize the amount of acetyl (or other acyl) added to the cellulose.

One object of our invention is to provide a method of preparaing dicarboxylic acid esters of cellulose in which the use of phthalic anhydride or other dicarboxylic acid anhydride is unnecessary. Another object of our invention is to provide a process for the preparation of dicarboxylic acid esters of cellulose in which solvents such as pyridine or highly volatile organic solvents need not be employed. A further object of our invention is to provide a method for preparing dicarboxylic acid esters of cellulose in which acetyl groups are present in the reaction bath but no acetylation of the starting material occurs. Other objects of our invention will appear herein.

We have found that mixed esters or ether containing dicarboxylic acid groups can be prepared when partially hydrolyzed lower fatty acid esters of cellulose or cellulose ethers having free hydroxyls are employed as the starting material and the esterification is carried out with an esterification bath of a dicarboxylic acid and a lower fatty acid anhydride such as acetic anhydride together with a catalyst which exhibits basic properties in a non-aqueous aliphatic acid solution. We have found that this esterification of the hydroxyl groups of the partially hydrolyzed cellulose ester or the cellulose ether is characterized by the addition of dicarboxylic acid radicals and but little or no other acyl and therefore the degree of introduction of dicarboxylic acid groups can be regulated by the amount of hydroxyl content of the cellulose ester or cellulose ether which is employed as the starting material. We have found that cellulose acetate dicarboxylates may be prepared by employing as the starting material any uniformly substituted hydrolyzed lower fatty acid ester of cellulose. If the resulting product is to be alkali soluble, it is desirable that the amount of apparent acetyl of the cellulose ester be no more than about 33–34%, the ester having been hydrolyzed down to that point. However, if alkali solubility is not of concern any hydrolyzed lower fatty acid ester of cellulose having an upper limit of apparent acetyl content of no more than 42% may be employed as the starting material. In our process the apparent acetyl content of the cellulose ester is the acyl content of the ester figured in terms of the acyl groups being all acetyl. Cellulose acetates of considerable acetyl content when used as the starting material dissolve directly in the glacial acetic acid employed as the solvent in our process but those which are not immediately soluble go into solution as the reaction proceeds. If desired, an additional solvent such as formamide may be added to the acetic acid to facilitate dissolving of the cellulose ester in the reaction mass.

As the phthalic acid esters of cellulose are more commonly used at the present time our invention will be described in terms of the preparation of cellulose acetate phthalates. However, it is to be understood that the preparation of the esters of other dicarboxylic acids such as succinic, maleic, nitrophthalic, etc. is contemplated by our invention. Also the groups of other lower fatty acids such as propionic or butyric may replace in whole or part the acetyl groups in the starting cellulose ester. For instance, a hydrolyzed cellulose acetate propionate or cellulose acetate butyrate or even the simple esters, i. e. cellulose propionate or butyrate, may be employed as the starting material in a process in accordance with our invention.

Instead of a cellulose ester, a cellulose ether such as ethyl cellulose which contains free and esterifiable hydroxyl groups is useful as the starting material in processes in accordance with our invention. Any uniformly substituted cellulose ether may be employed as the starting material but if the final product is to be alkali soluble it is desirable that the cellulose ether employed have an ethoxyl (or other alkoxyl) content of no more than 48–50%.

Some of the catalysts which are especially useful for promoting the process described herein are the acetates of the alkali metals, the alkaline earth metals or the organic amines. Some catalysts of this nature are sodium acetate, potassium acetate, calcium acetate, magnesium acetate, trimethyl amine acetate, pyridine acetate and the like. The catalyst is effective when used in small proportion but larger proportions thereof may be employed if desired. Ordinarily 100% of catalyst based on the weight of the cellulosic starting material is adequate but amounts thereof within the range of 5–150% based on the weight of the cellulosic starting material will be effective. When a higher proportion of catalyst is used a large proportion of aliphatic acid solvent is desirable. In our process the amount of dicarboxylic acid employed in the esterification mixture need not exceed 4 times the theoretical amount of that acid needed to esterify the hydroxyl of the cellulose ester or ether starting material. In our process of the lower fatty acid anhydrides which may be employed, acetic anhydride is most effective but included within the scope of our invention is the use of other lower fatty acid anhydrides to impel the esterification such as propionic, butyric and isobutyric anhydrides. The amount of the lower fatty acid anhydride employed should be sufficient to promote the reaction and ordinarily should be within the range of 1½–3 times the hydroxyl to be esterified figured in terms of mole percents. If desired a still larger proportion of the acid anhydride may be employed and in cases where water is present the use of larger quantities of acid anhydride are necessary to combine with the water and still obtain the desired proportion of anhydride in the esterification mass. The amount of solvent employed should be sufficient to render the bath sufficiently fluid that the reaction occurs readily. In the esterification of cellulose esters and ethers in accordance with our invention, the molar quantity of acetic anhydride should not exceed that of the dibasic acid employed as otherwise some acetylation may occur.

The following examples illustrate our invention:

Example 1

1 part of a dry, hydrolyzed cellulose acetate having an acetyl content of 32% was mixed with 1 part of phthalic acid, 1 part of sodium acetate, and .6 part of acetic anhydride all in 4 parts of glacial acetic acid. The mixture was stirred for 5 hours at approximately 100° C. The cellulose acetate phthalate thus obtained was separated from the mass by precipitating in water. The product was found to have a phthalyl content of 24%, an acetyl content of 24.2% and to be soluble in dilute aqueous sodium bicarbonate solution.

Example 2

1 part of dry, hydrolyzed cellulose acetate having an acetyl content of 32% was stirred into a mixture of 1 part of 3-nitrophthalic acid, 1 part of sodium acetate and .6 part of acetic anhydride all in 4 parts of glacial acetic acid. The mass was agitated for 5 hours at 100° C. and the product obtained was recovered by precipitation in water. The cellulose acetate nitrophthalate which resulted had a nitrophthalyl content of 40.1% and was soluble in dilute ammonia water.

Example 3

Several batches of cellulose acetate phthalate were prepared by reacting upon 50 parts of hydrolyzed cellulose acetate of 32% acetyl content (about 0.27 mol of hydroxyl) with esterification mixtures of varied compositions. In each case the mixtures were heated for 5 hours on a steam bath. The number of moles of sodium acetate, acetic anhydride and phthalic acid used and the acetyl and phthalyl contents of the resulting product are given in the following table; the amount of acetic acid employed being sufficient to provide good fluidity.

| Sodium Acetate | Acetic Anhydride | Phthalic Acid | Percent Acetyl | Percent Phthalyl |
|---|---|---|---|---|
| .6 | .3 | .3 | 22.9 | 25.8 |
| .6 | .5 | .5 | 21.2 | 31.3 |
| .6 | .7 | .7 | 20.7 | 32.6 |

Example 4

Example 1 was repeated except that maleic acid was substituted for phthalic acid in an equivalent molar amount. The product obtained had a maleyl content of 19.7%.

Example 5

50 parts of cellulose acetate having an acetyl content of 31% was heated in a mixture of 200 parts of acetic acid, 50 parts of sodium acetate, 50 parts of acetic anhydride and 50 parts of succinic acid. The mass was heated for 5 hours at 100° C. and the cellulose acetate succinate formed was precipitated by pouring the mass into agitated aqueous hydrochloric acid. The product obtained analyzed 32.3% succinyl and was soluble in an aqueous solution of sodium bicarbonate.

Example 6

The above example was repeated except that diglycolic acid was employed rather than succinic acid. The product obtained had a diglycolyl content of 17.2%.

Example 7

1 part of cellulose acetate having an acetyl content of 32% was heated with a mixture of 4 parts of glacial acetic acid, 1 part of pyridine, 1.18 parts of succinic acid and 1.04 parts of acetic anhydride. A second portion of acetate was heated in a mixture of the same formula except that the 1 part of pyridine was replaced with 1 part of sodium acetate. The product was analyzed with the following results as regards the acetyl and succinyl contents:

|  | Pyridine Catalyst | Sodium Acetate Catalyst |
|---|---|---|
|  | Percent | Percent |
| Acetyl | 22.6 | 21.2 |
| Succinyl | 31.4 | 34.0 |

Example 8

A polyvinyl acetate phthalate was prepared by heating 1 part of a hydrolyzed polyvinyl acetate having an acetyl content of 5% with a mixture of 10 parts of acetic acid, 3 parts of acetic anhydride, 5 parts of phthalic acid and 5 parts of sodium acetate on a steam bath for 6 hours. The reaction mixture thus obtained was diluted with acetone-water and was then precipitated by pouring into dilute aqueous hydrochloric acid. The polyvinyl acetate phthalate thus obtained was soluble in sodium bicarbonate solution and had a phthalyl content of 72.9%.

Example 9

50 parts of ethyl cellulose, 46% ethoxyl, was agitated in a mixture of 200 parts of acetic acid, 50 parts of sodium acetate, 83 parts of phthalic acid and 51 parts of acetic anhydride for 5 hours at 100° C. The cellulose ether phthalate obtained was recovered by pouring the reaction mixture into water and washing. It had a phthalyl content of 19.3% phthalyl and was soluble in aqueous sodium bicarbonate in the cold.

Example 10

The preceding example was repeated except that the dicarboxylic acid used was 59 parts of succinic acid rather than 83 parts of phthalic acid. The ethyl cellulose succinate obtained had a succinyl content of 19.5%.

Example 11

Cellulose acetates of the designated acetyl contents were phthalylated in baths of the compositions given by a procedure as specified in Example 1. The phthalyl contents of the celulose acetate phthalates obtained are as given:

|  | 24% acetyl ester | 17% acetyl ester |
|---|---|---|
| Cellulose ester ............................ gm | 50 | 50 |
| Acetic acid ............................... gm | 200 | 200 |
| Sodium acetate .......................... gm | 50 | 100 |
| Acetic anhydride ........................ gm | 51 | 102 |
| Phthalic acid ............................ gm | 83 | 166 |
| Phthalyl in product .................. percent | 36.7 | 52.6 |

At the start the cellulose esters were not readily soluble, but a uniform solution formed after a short reaction time.

We claim:

1. The process of preparing dicarboxylic acid esters of cellulose derivatives which comprises heating a cellulose compound selected from the group consisting of the hydrolyzed lower fatty acid esters of cellulose and the ethers of cellulose having free and esterifiable hydroxyl groups in an esterification mixture of a dicarboxylic acid, a lower fatty acid anhydride, a salt which exhibits basic properties in its solution in non-aqueous acetic acid as the catalyst and as the solvent acetic acid.

2. The process of preparing mixed esters containing dicarboxylic acid groups which comprises heating a hydrolyzed lower fatty acid ester of cellulose in an esterification mixture of a dicarboxylic acid, a lower fatty acid anhydride, as the catalyst a salt which exhibits basic properties in its solution in non-aqueous acetic acid and as the solvent acetic acid.

3. The process of preparing cellulose ether esters containing dicarboxylic acid radicals which comprises heating a cellulose ether having free and esterifiable hydroxyl groups in an esterification mixture of a dicarboxylic acid, a lower fatty acid anhydride, a salt which exhibits basic properties in its solution in nonaqueous acetic acid as the catalyst and as the solvent acetic acid.

4. A process of preparing mixed cellulose esters containing phthalyl groups which comprises heating a hydrolyzed lower fatty acid esters of cellulose in an esterification mixture of phthalic acid, a lower fatty acid anhydride, a salt which exhibits basic properties in its solution in non-aqueous acetic acid as the catalyst and as the solvent acetic acid.

5. The process of preparing cellulose ether phthalates which comprises heating a cellulose ether having free and esterifiable hydroxyl groups in an esterification mixture of phthalic acid, a lower fatty acid anhydride, a salt which exhibits basic properties in its solution in non-aqueous acetic acid as the catalyst and as the solvent acetic acid.

6. The process of preparing succinic acid esters of cellulose derivatives which comprises heating a cellulose compound selected from the group consisting of hydrolyzed lower fatty acid esters of cellulose and the ethers of cellulose having free and esterifiable hydroxyl groups in an esterification mixture of succinic acid, a lower fatty acid anhydride, a salt which exhibits basic properties in its solution in non-aqueous acetic acid as the catalyst and as the solvent acetic acid.

7. The process of preparing cellulose ether phthalates which comprises heating ethyl cellulose having free and esterifiable hydroxyl groups in an esterification mixture of phthalic acid, a lower fatty acid anhydride, a salt which exhibits basic properties in its solution in non-aqueous acetic acid as the catalyst and as the solvent acetic acid.

8. The process of preparing phthalic acid esters of cellulose derivatives which comprises heating a cellulose compound selected from the group consisting of the hydrolyzed lower fatty acid esters of cellulose and the ethers of cellulose having free and esterifiable hydroxyl groups in an esterification mixture of a phthalic acid, acetic anhydride, a salt which exhibits basic properties in its solution in non-aqueous acetic acid as the catalyst and as the solvent acetic acid.

9. The process of preparing cellulose acetate phthalates which comprises heating a hydrolyzed cellulose acetate in an esterification mixture of phthalic acid, acetic anhydride, sodium acetate as the catalyst and as the solvent acetic acid.

10. The process of preparing cellulose ether phthalates which comprises heating ethyl cellulose having free and esterifiable hydroxyl groups in an esterification mixture of phthalic acid, acetic anhydride, sodium acetate as the catalyst and as the solvent acetic acid.

References Cited in the file of this patent

UNITED STATES PATENTS

| | | |
|---|---|---|
| 1,981,425 | McNally | Nov. 20, 1934 |
| 2,048,685 | Clarke et al. | July 28, 1936 |
| 2,069,974 | Schulze | Feb. 9, 1937 |
| 2,076,181 | Hopkinson et al. | Apr. 6, 1937 |
| 2,093,462 | Malm et al. | Sept. 21, 1937 |
| 2,175,357 | Maxwell | Oct. 10, 1939 |
| 2,183,982 | Blanchard et al. | Dec. 19, 1939 |
| 2,285,536 | Seymour et al. | June 9, 1942 |
| 2,759,925 | Hiatt et al. | Aug. 21, 1956 |